United States Patent [19]

Hong

[11] Patent Number: 5,455,718
[45] Date of Patent: Oct. 3, 1995

[54] DOUBLE DECK CAMCORDER

[75] Inventor: Kuen pyo Hong, Kyounggi, Rep. of Korea

[73] Assignee: SamSung Electronics Co., Ltd., Kyungki, Rep. of Korea

[21] Appl. No.: 636,852

[22] Filed: Dec. 31, 1990

[30] Foreign Application Priority Data

Apr. 30, 1990 [KR] Rep. of Korea ................ 6135/90

[51] Int. Cl.[6] .................................................. H04N 5/78
[52] U.S. Cl. ........................ 360/33.1; 358/906; 358/335
[58] Field of Search ........................ 358/906, 6, 335; 360/33.1, 13, 15; 348/207

[56] References Cited

U.S. PATENT DOCUMENTS

| | | | |
|---|---|---|---|
| 4,262,301 | 4/1981 | Erlichman | 358/906 X |
| 4,558,368 | 12/1985 | Aoki et al. | 358/906 X |
| 4,768,110 | 8/1988 | Dunlap et al. | 360/33.1 |

*Primary Examiner*—Andrew L. Sniezek
*Attorney, Agent, or Firm*—Robert E. Bushnell

[57] ABSTRACT

A double deck camcoder comprising a camera, a double deck video tape recorder, a viewfinder, a monitor, and each input/output signal selection circuit in one housing, wherein the recording operation of the double video tape recorder can be performed successively so the recording operation can be continued for a long time and the power consumption can be reduced by providing the power only to the part which is selected by each input and output selection element.

9 Claims, 1 Drawing Sheet

DOUBLE DECK CAMCORDER

BACKGROUND OF THE INVENTION

The present invention relates to a camcorder with both video tape recorder (VTR) and video camera functions and, more particularly, to a double deck camcorder which can accommodate two video tape recorders in a single housing or case for compatibility of tapes.

A conventional camcorder comprises a single video tape recorder deck, a camera and a viewfinder, in which a user can watch record image signals of the camera or playback signals of a video tape recorder through an external monitor. However, problems exist in that in order to record on 8 mm video tape in a VHS-Full system or in order to record/ reproduce on a VHS-C tape inβ system, two camcorders or an additional video tape recorder are required.

As a solution for compatibility of those video tape recorders, an input terminal for image signals of the camera is installed in the double deck video tape recorder to record the signals from the camera as disclosed in U.S. Pat. No. 4,768,110. In this case, however, the camera and the double deck video tape recorder must be individually provided and it is inconvenient to carry a video tape recorder.

SUMMARY OF THE INVENTION

An object of the present invention is to provide a double deck camcorder which combines the double deck video tape recorder with a camera in a single housing or case to obtain compatibility.

According to the present invention, there is provided a double deck camcorder in a single housing comprising: a camera, a double deck video tape recorder with record and playback functions, a viewfinder for monitoring record signals of the double deck video tape recorder, a monitor for monitoring output signals of the viewfinder and playback signals of the double deck video tape recorder, an input signal selection device connected to an output node of the camera for selecting a video signal, and an output signal selection device connected to an output node of the video tape recorder for selecting an output among output signals of the double deck video tape recorder and an output signal of the viewfinder.

BRIEF DESCRIPTION OF DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
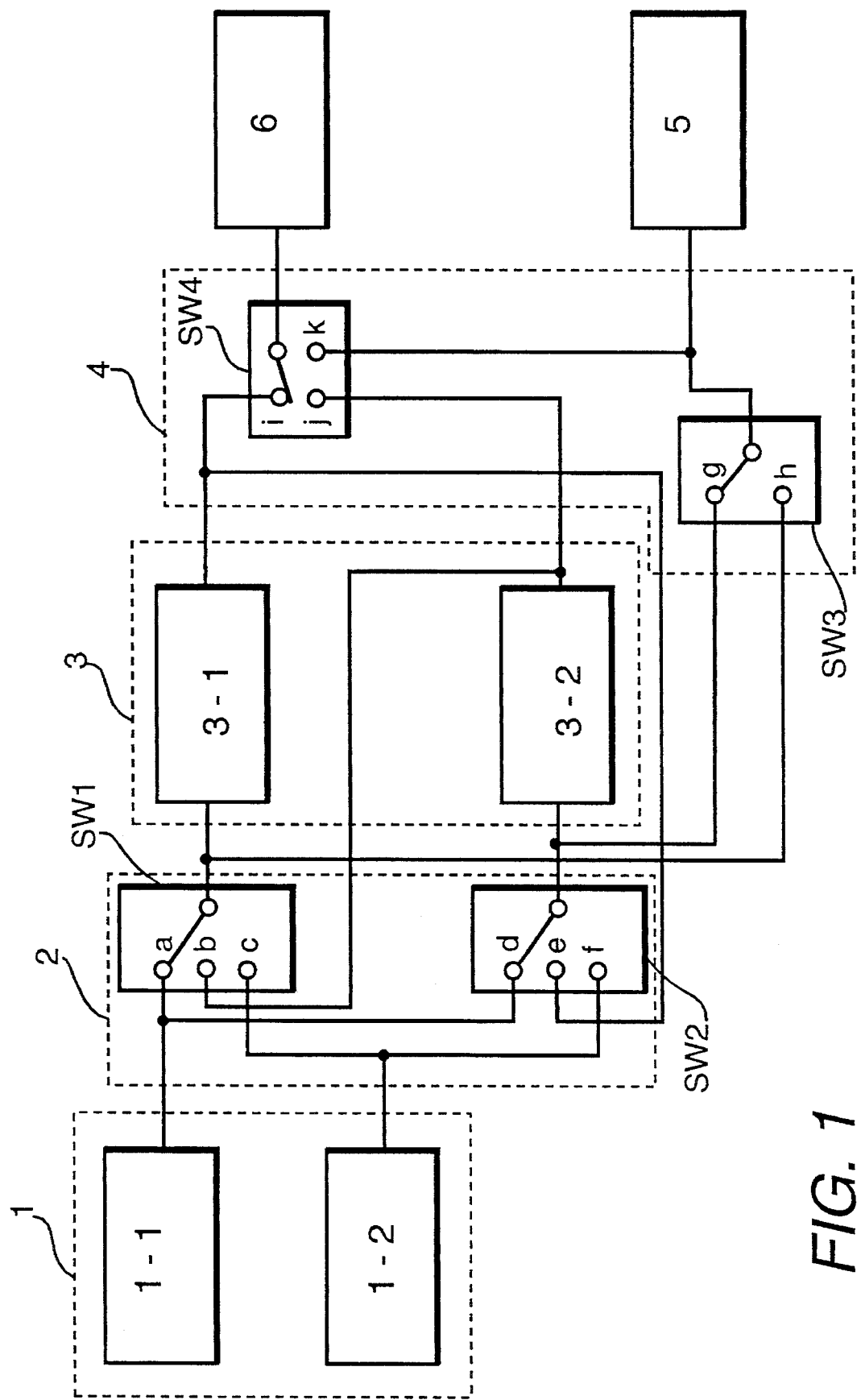
FIG. 1 is a detailed circuit diagram representing a double deck camcorder according to the present invention.

FIG. 1 shows a block diagram of a double deck camcorder according to the present invention, comprises: a camera 1, an input signal selection circuit 2, a double deck video tape recorder 3, an output signal selection circuit 4, a viewfinder 5, and a monitor 6, wherein the camera 1, the double deck video tape recorder 3, and the input and output signal selection circuits 2 and 4 are accommodated in a single housing or case. The camera 1 includes a camera part 1—1 having a lens, a camera component, and an amplifier and a signal processor and an external jack part 1—2.

More specifically, an image sensor is connected to an output node of a lens part to convert input lights to electrical image signals, and the amplifier and signal processor is also connected to the output terminal of the image sensor for carrying out gamma and flare compensations of the electrical image signals.

Conversely, the input signal selection circuit 2 is connected to both output terminals of the camera part 1—1 and the external jack part 1—2, and includes two switches SW1 and SW2. The output terminal of the camera part 1—1 is connected to both terminals (a) and (d) of the switches SW1 and SW2 respectively, while the output terminal of the external jack part 1—2 to be applied with external audio and video signals is connected to both terminals (c) and (f) of the switches SW1 and SW2 respectively, Next, the double deck video tape recorder 3 including each separate video tape recorder 3—1 and 3—2 is connected to both output terminals of the switches SW1 and SW2. Each video tape recorder 3—1 and 3—2 includes a deck mechanism, a signal processor, a servo-motor and a controller similar to the conventional video tape recorder. The video television recorders 3—1 and 3—2 are selectively formed of VHS or 8 mm tapes which may be composed identical to different from each other according to their purpose and use. Also, output terminals of the video tape recorders 3—1 and 3—2 are respectively connected to terminals (b) and (e) of the switches SW1 and SW2 so as to drive the video tape recorders in sequence.

In order to provide the image and audio signals which are received from the camera part 1—1 and the external jack part 1—2 through the viewfinder 5, a switch SW3 of the output signal selection circuit 4 is connected to the output terminals of the switches SW1 and SW2 of the input signal selection part 2. If a terminal (g) of the switch SW3 is selected, the signal to be applied to the video tape recorder 3—1 is provided to the viewfinder 5, and if a terminal (h) is selected, the signal to be applied to the other video tape recorder 3—2 is provided to the viewfinder 5.

A switch SW4 of the output signal selection circuit 4 is connected to the output terminals of the video tape recorders 3—1 and 3—2 and the switch SW3, and selects one of the playback signals of the video tape recorders 3—1 and 3—2 and an output signal of the viewfinder 5.

Finally, the monitor 6 is connected to an output terminal of the switch SW4 of the output signal selection circuit 4. The monitor 6 may be an external monitor or a TV monitor. The switches SW1 and SW2 in the input signal selection circuit 2 and the switches SW3 and SW4 in the output signal selection circuit 4 are controlled manually or automatically by a microcomputer MICOM.

According to the present invention, the light provided through the lens of the camera part 1-1 is converted to an electrical image signal by the image sensor. This image signal is applied to both terminals (a) and (b) of the switches SW1 and SW2 in the input signal selection circuit 2. Conversely, the video and audio signals through the external jack part 1-2 are applied to both terminals (c) and (f) of the switches SW1 and SW2 in the input signal selection circuit 2.

According to such selections of the switches SW1 and SW2, the image signal provided through the camera 1 is applied to each of the separate video tape recorders 3-1 and 3-2. Then, the image signal applied to the video tape recorders 3-1 and 3-2 is recorded or reproduced by the video tape recorders 3-1 and 3-2. In the input signal selection circuit 2, if the terminal (a) of the switch SW1 is selected, the input signal from the camera part 1-1 is recorded by the video tape recorder 3-1 and if the terminal (c) of the switch SW1 is selected, the input signal from the external jack part 1-2 is recorded by the video tape recorder 3-1.

Such selection operations of the switches SW1 and SW2 are carried out manually by users or automatically by the MICOM. Then, the output signals of the video tape recorders 3-1 and 3-2 are respectively applied to the terminals (b) and (e) of the switches SW1 and SW2, so that after the video tape recorder 3-1 completes its record reproduction operation, the other video tape recorder 3-2 subsequently operates its record or playback function.

Conversely, the image signals of the camera part 1-1 applied through the video tape recorders 3-1 and 3-2 or the video and audio signals of the external jack part 1-2 are selected by the switch SW3 of the output signal selection circuit 4 and provided to the viewfinder 5. Subsequently, one of the output signals of the viewfinder 5 and the output signals of the video tape recorders 3-1 and 3-2 is selected by the switch SW4 of the output signal selection circuit 4 and this selected signal is provided to the monitor 6. Therefore, the record or playback signal is displayed on the monitor 6 so several record or playback signals can be simultaneously displayed through several corresponding channels of the monitor 6.

As mentioned above, the present invention accommodates the camera, the double deck video tape recorder, and the input and output selection circuits in a single housing or case except the viewfinder and the monitor. Further, according to the present invention, after completing the recording operation of one video tape recorder, the invention successively operates a second video tape recorder, and thus the recording operation can be continued for a long time. Moreover, the present invention minimizes power consumption by providing power only to the part which is selected by the input and output selection circuits.

The present invention is in no way limited to the embodiment described hereinabove. Various modifications of the disclosed embodiment as well as other embodiments of the invention will become apparent to persons skilled in the art upon reference to the description of the invention. It is believed, that the appended claims will cover any such modifications or embodiments as fall within the true scope of the present invention.

What is claimed is:

1. A dual cassette camcorder comprising:

camera means for generating first video signals of a viewed image;

an external jack for inputting second video signals received from an external source;

double deck video tape recording means for recording one of said first video signals and said second video signals, and for playing back of those signals which were recorded;

first switch means for receiving and selectively providing one of said first video signals, said second video signals and a signal played back by said double deck video tape recording means as an input to said double deck video tape recording means to be recorded;

second switch means for providing the signal selected by said first switch means for input to said double deck video recording means for recording to a view finder;

said view finder displaying the signal provided by said second switch means; and third switch means for selectively providing one of said signal played back by said double deck video recording means and said signal provided by said second switch means to a monitor.

2. The dual cassette video camcorder as claimed in claim 1, wherein said double deck video recording means comprises:

a first video cassette recorder for receiving and recording said signal provided by said first switch means and for providing a first playback signal; and a second video cassette recorder for receiving and recording said signal provided by said first switch means and for providing a second playback signal.

3. The dual cassette video camcorder as claimed in claim 2, wherein said first switch means comprises:

a first switch having at least three input terminals connected to receive said first video signals, said second playback signal and said second video signals, respectively, and for selectively providing one of said first video signals, said second playback signal and said second video signals to said first video cassette recorder; and a second switch having at least three input terminals connected to receive said first video signals, said first playback signal, and said second video signals, respectively, and for selectively providing one of said first video signals, said second playback signal and said second video signals to said second video cassette recorder.

4. The dual cassette video camcorder as claimed in claim 3, wherein said second switch means comprises:

a third switch having a first input terminal connected to an output terminal of said first switch, a second input terminal connected to an output terminal of said second switch, and an output terminal connected to an input of said view finder.

5. The dual cassette camcorder as claimed in claim 4, wherein said third switch means comprises:

a fourth switch having a first input terminal connected to receive said first playback signal, a second input terminal connected to receive said second playback signal, a third input terminal connected to the output terminal of said third switch, and an output terminal connectable to said monitor.

6. The dual cassette camcorder as claimed in claim 1, said external jack being capable of receiving and inputting audio signals to be recorded by said double deck video tape recording means.

7. A camcorder, comprising:

camera means for generating a first video signal;

an input jack for receiving a second video signal;

a first video tape recorder for recording a first selected signal and for outputting a first playback signal;

a second video tape recorder for recording a second selected signal and for outputting a second playback signal;

a first switch having a first input terminal connected to receive said first video signal, a second input terminal connected to receive said second playback signal, a third input terminal connected to receive said second video signal, and an output terminal selectively connected to one of said first, second and third input terminals for outputting said first selected signal;

a second switch having a first input terminal connected to receive said first video signal, a second input terminal connected to receive said first playback signal, a third input terminal connected to receive said second video signal and an output terminal selectively connected to one of said first, second and third input terminals of said second switch for outputting said second selected signal;

a third switch having a first input terminal connected to receive the first selected signal, a second input terminal connected to receive the second selected signal and an output terminal selectively connected to said first and second input terminals of said third switch for view finder means for receiving and displaying said third selected signal; and 8. The camcorder as claimed in claim 7, further comprising:

a fourth switch having a first input terminal for receiving said first playback signal, a second input terminal for receiving said second playback signal, a third input terminal for receiving said third selected signal and an output terminal selectively connected to said first, second and third input terminals of said fourth switch for outputting a fourth selected signal for display on a monitor.

9. The camcorder as claimed in claim 7, wherein said input jack further receives audio signals to be provided to said third input terminal of said first and second switches.

* * * * *

UNITED STATES PATENT AND TRADEMARK OFFICE
CERTIFICATE OF CORRECTION

PATENT NO. : 5,455,718
DATED : 3 October 1995
INVENTOR(S) : Kuen- Pyo Hong

It is certified that error appears in the above-indentified patent and that said Letters Patent is hereby corrected as shown below:

Column 1,

Line 59    Change "comprises" to ---comprising--;

Column 2

Line 25    After "to" Insert --or--;

Column 5

Line 12    After "for" Insert --outputting a third selected signal; and--:
    Line 14, change "; and" to --.--.

Signed and Sealed this

Nineteenth Day of November, 1996

Attest:

BRUCE LEHMAN

*Attesting Officer*    *Commissioner of Patents and Trademarks*